(12) United States Patent
Barkan et al.

(10) Patent No.: US 9,467,567 B1
(45) Date of Patent: Oct. 11, 2016

(54) SYSTEM, METHOD, AND COMPUTER PROGRAM FOR PROACTIVE CUSTOMER CARE UTILIZING PREDICTIVE MODELS

(71) Applicant: Amdocs Software Systems Limited, Dublin (IE)

(72) Inventors: Gilad Barkan, Kfar Monash (IL); Yaniv Yassour, Bethesda, MD (US); Jose Pedro Sarmento Fernandes, Mountain View, CA (US); Sergio Gonzalez Sanz, Sandyford (IE)

(73) Assignee: Amdocs Software Systems Limited, Dublin (IE)

( * ) Notice: Subject to any disclaimer, the term of this patent is extended or adjusted under 35 U.S.C. 154(b) by 161 days.

(21) Appl. No.: 14/244,833

(22) Filed: Apr. 3, 2014

(51) Int. Cl.
    *H04M 3/00*     (2006.01)
    *H04M 3/523*     (2006.01)

(52) U.S. Cl.
    CPC ................... *H04M 3/5232* (2013.01)

(58) Field of Classification Search
    CPC ........... H04M 3/5158; H04M 3/5183; H04M 3/5232; H04M 3/523; H04M 3/5175; H04M 3/5238; H04M 3/5233
    USPC ................ 379/265.1, 266.07, 265.01–26.02
    See application file for complete search history.

(56) References Cited

U.S. PATENT DOCUMENTS

| | | | | |
|---|---|---|---|---|
| 2002/0161764 | A1* | 10/2002 | Sharo | G06Q 30/0201 |
| 2003/0200135 | A1* | 10/2003 | Wright | G06Q 30/0201 705/7.29 |
| 2005/0234753 | A1* | 10/2005 | Pinto | G06Q 10/04 700/44 |

OTHER PUBLICATIONS

Radcliffe, N., "Generating Incremental Sales; Maximizing the incremental impact of cross-selling, up-selling and deep-selling through uplift modelling," Stochastic Solutions, 2007, pp. 1-10.
"Uplift modelling," Wikipedia, Feb. 8, 2014, retrieved from http://en.wikipedia.org/wiki/Uplift_modelling.

* cited by examiner

*Primary Examiner* — Rasha Al Aubaidi
(74) *Attorney, Agent, or Firm* — Zilka,Kotab, PC

(57) ABSTRACT

A system, method, and computer program product are provided for proactive customer care utilizing predictive models. In use, historical data associated with a plurality of customers of a service provider is identified. Further, at least one first predictive model is generated based on the historical data associated with the plurality of customers, the at least one first predictive model indicating a propensity of each of the plurality of customers to call a call center associated with the service provider. Additionally, a portion of the plurality of customers are proactively notified based on call propensity information associated with the at least one first predictive model, in response to identifying at least one customer issue associated with the plurality of customers, the portion of the plurality of customers including customers identified as persuadable customers based on the at least one first predictive model. Furthermore, a behavior of the plurality of customers is monitored. In addition, at least one second predictive model is generated, based at least in part on the behavior of the plurality of customers.

18 Claims, 13 Drawing Sheets

| Confusion Matrix | Predicted Value | |
|---|---|---|
| | Will-Call | Will-Not-Call |
| Actual True Value Did-Call | True Positive – TP (correctly predicted as will-call) | False Negative – FN (Incorrectly predicted as won't call, but actually customer did-call) |
| Did-Not-Call | False Positive – FP (Incorrectly predicted as will-call, but actually customer did-not-call) | True Negative – TN (correctly predicted as will-not-call) |

FIGURE 4

| Measure | Formula | Intuitive Meaning |
|---|---|---|
| Precision | TP / (TP + FP) | The percentage of positive predictions that are correct. |
| Recall / Sensitivity | TP / (TP + FN) | The percentage of positive labeled instances that were predicted as positive. |
| Specificity | TN / (TN + FP) | The percentage of negative labeled instances that were predicted as negative. |
| Accuracy | (TP + TN) / (TP + TN + FP + FN) | The percentage of predictions that are correct. |

FIGURE 5

SYSTEM, METHOD, AND COMPUTER PROGRAM FOR PROACTIVE CUSTOMER CARE UTILIZING PREDICTIVE MODELS

FIELD OF THE INVENTION

The present invention relates to service providers, and more particularly to providing proactive customer care to customers of such service providers.

BACKGROUND

In today's increasingly competitive market, customer loyalty and satisfaction are critical to the success of business. Proactively contacting customers with useful service information is generally viewed by customers as positive and brand reinforcing. These positive effects contribute to both customer loyalty and satisfaction over time, as well as to business return on investment (ROI).

However, not all customers react favorably to proactive contact. For example, some customers may not respond to a proactive communication and other customers may respond negatively to a proactive communication. Accordingly, identifying customers that will respond in a positive manner to proactive communication would be beneficial to businesses.

There is thus a need for addressing these and/or other issues associated with the prior art.

SUMMARY

A system, method, and computer program product are provided for proactive customer care utilizing predictive models. In use, historical data associated with a plurality of customers of a service provider is identified. Further, at least one first predictive model is generated based on the historical data associated with the plurality of customers, the at least one first predictive model indicating a propensity of each of the plurality of customers to call a call center associated with the service provider. Additionally, a portion of the plurality of customers are proactively notified based on call propensity information associated with the at least one first predictive model, in response to identifying at least one customer issue associated with the plurality of customers, the portion of the plurality of customers including customers identified as persuadable customers based on the at least one first predictive model. Furthermore, a behavior of the plurality of customers is monitored. In addition, at least one second predictive model is generated, based at least in part on the behavior of the plurality of customers.

BRIEF DESCRIPTION OF THE DRAWINGS

FIG. 4 shows a confusion matrix for customer care, in accordance with one embodiment.

FIG. 5 illustrates a chart showing confusion matrix based performance metrics, in accordance with one embodiment.

DETAILED DESCRIPTION

Figure 1:
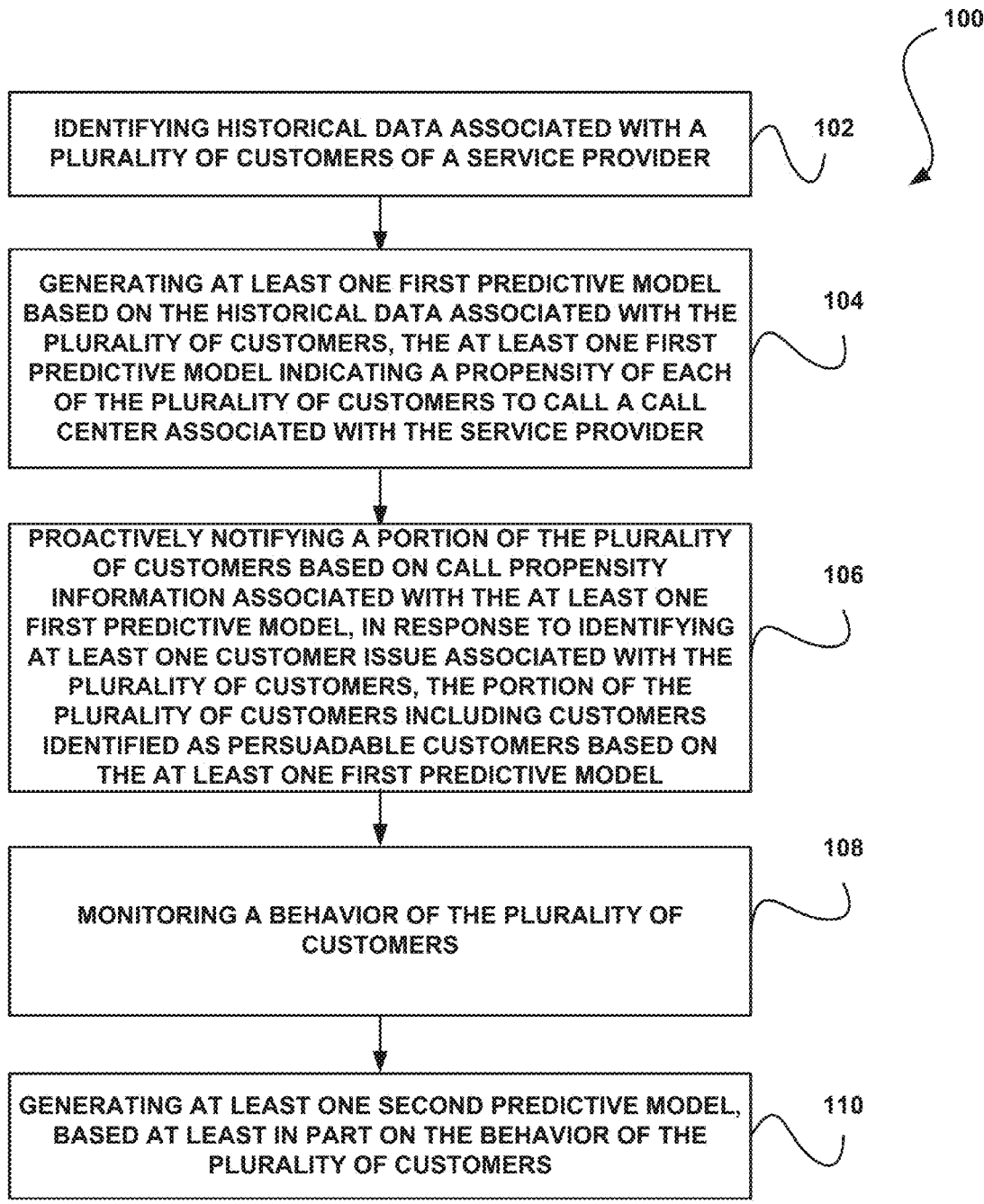
FIG. 1 illustrates a method for proactive customer care utilizing predictive models, in accordance with one embodiment.

FIG. 1 illustrates a method 100 for proactive customer care utilizing predictive models, in accordance with one embodiment.

As shown, historical data associated with a plurality of customers of a service provider is identified. See operation 102. The service provider may include any type of service provider. For example, in one embodiment, the service provider may include a communications service provider.

Further, the historical data associated with the customers may include any type of past data. For example, the historical data may include a number of times a customer has contacted (e.g. called, emailed, etc.) a call center associated with the service provider, dates of the contacts, reasons for the contacts, and/or various other historical data associated with the customer. In one embodiment, the historical data may be stored in one or more databases associated with the service provider.

As shown further in FIG. 1, at least one first predictive model is generated based on the historical data associated with the plurality of customers, the at least one first predictive model indicating a propensity of each of the plurality of customers to call a call center associated with the service provider. See operation 104. The historical data associated with the customers may be analyzed to generate the predictive model. Moreover, in one embodiment, the first predictive model may include a call propensity model.

In one embodiment, the predictive model (e.g. a call propensity model) may be utilized to generate a first up-lift model. An up-lift model is a predictive model that directly models an incremental impact of a treatment on an individual's behavior. Up-lift models may be used to identify customers who act favorably to a designated action because they were targeted (e.g. called 'persuadables'), customers who act favorably whether they were targeted or not (e.g. called 'sure things'), customers who will not act favorably irrespective of whether or not they are targeted (e.g. called 'lost causes'), and/or customers who will not act favorably because they were targeted, i.e. the targeting backfires (e.g. called 'sleeping dogs'). Customers whose behavior remains unchanged regardless of treatment are typically called 'immovables' (i.e. such as 'sure things', and 'lost causes', etc.).

In one embodiment, the first up-lift model may be used to forecast a return on investment (ROI) that would result from contacting a segment of the customers. For example, a graphical user interface may be displayed including the forecast of the ROI. In this case, the first up-lift model may be utilized to generate an up-lift chart capable of being displayed utilizing the graphical user interface, such that ROI is plotted versus a percentage of customers targeted (e.g. in order from a highest propensity to call a call center to lowest propensity to call the call center, etc.).

In one embodiment, the graphical user interface may be utilized to identify an optimal threshold for a selected target population, based on a target ROI. In this case, the selected target population may identify an optimal portion of customers that would benefit from being proactively contacted, in response to an identified issue, etc. (e.g. persuadables). Thus, customers with a call propensity higher than the optimal threshold may be proactively notified and customers with a call propensity lower than the optimal threshold may not be notified.

Further, in one embodiment, the first predictive model may represent a call propensity and may be associated with an up-lift chart calculated utilizing an F-measure performance metric of the first predictive model. Additional information associated with calculating the F-measure is discussed below.

As shown further in FIG. 1, a portion of the plurality of customers are proactively notified based on call propensity information associated with the at least one first predictive model, in response to identifying at least one customer issue associated with the plurality of customers, the portion of the plurality of customers including customers identified as persuadable customers based on the at least one first predictive model. See operation 106.

In one embodiment, proactively notifying the customers may include proactively sending a message to the customers (e.g. an email, a text message, etc.).

Furthermore, a behavior of the plurality of customers is monitored. See operation 108.

In one embodiment, monitoring the behavior of the customers may include determining whether any customer calls the call center in response to the notification. For example, in order to calculate up-lift in live production, a customer's response to the notifications that were sent may be measured (i.e. it may be determined whether the customer eventually called after being notified).

In addition, at least one second predictive model is generated, based at least in part on the behavior of the plurality of customers. See operation 110. In one embodiment, generating the second predictive model may include generating a backfire propensity model. In one embodiment, the second predictive model may be utilized to generate a second up-lift model. Further, in one embodiment, another portion of customers to proactively notify may be determined utilizing the backfire propensity model.

Utilizing the method 100, prediction models may be implemented in two phases, a pre-production phase and a post-production phase, with various benefits to service providers within each one of the phases. These benefits may be realized because the first predictive model independently targets a first portion of the plurality of customers and the second predictive model independently targets a second portion of the plurality of customers. For example, by cascading the second predictive model, which includes a backfire propensity model, after the first predictive model (in this order), which includes a call propensity model, an intersection of the first portion of the plurality of customers and the second portion of the plurality of customers may result, thus resulting in a final target best persuadable customers segment.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Utilizing the method described in the context of FIG. 1, a service provider, e.g. a communication service provider (CSP) system may operate to detect customer issues when they occur and proactively contact these customers in order to either deflect or shed their potential calls to a call center, due to these emerged issues, hence reducing significant costs to the CSP.

Using up-lift modeling, predictive models may be used to focus and contact only the persuadable customers (i.e. customers who call the call center only if proactively contacted). The rest of the customers, including 'immovables' (i.e. customers whose behavior remains unchanged, regardless of treatment—sure things and lost causes) and 'sleeping dogs' (i.e. the treatment backfires), may not be contacted.

In one embodiment, prediction models may be implemented in two phases, with various benefits to the CSP within each one of the phases. For example, a first phase may include a pre-production phase, prior to deployment in a CSP's production, (i.e. prior to contacting any customer, etc.).

In this first phase, a data analysis survey may be conducted on historical data of customer calls to a call center. Predictive models may then be built, based on this historical data, to predict the individual likelihood (i.e. propensity) of each customer to call the call center, at any given point of time.

Unlike traditional methods, where customers are treated as one big segment and therefore targeted randomly, these generated proactive care predictive models may be utilized to gain insight about each one of the customers (i.e. a 'segment-of-one'), at any given moment, such as their propensity to call the call center. Using these insights, customers that are most likely to call may be first targeted, and only then the less likely customers may be contacted, in decreasing order of call propensities. This is further illustrated in FIG. 2.

Figure 2:
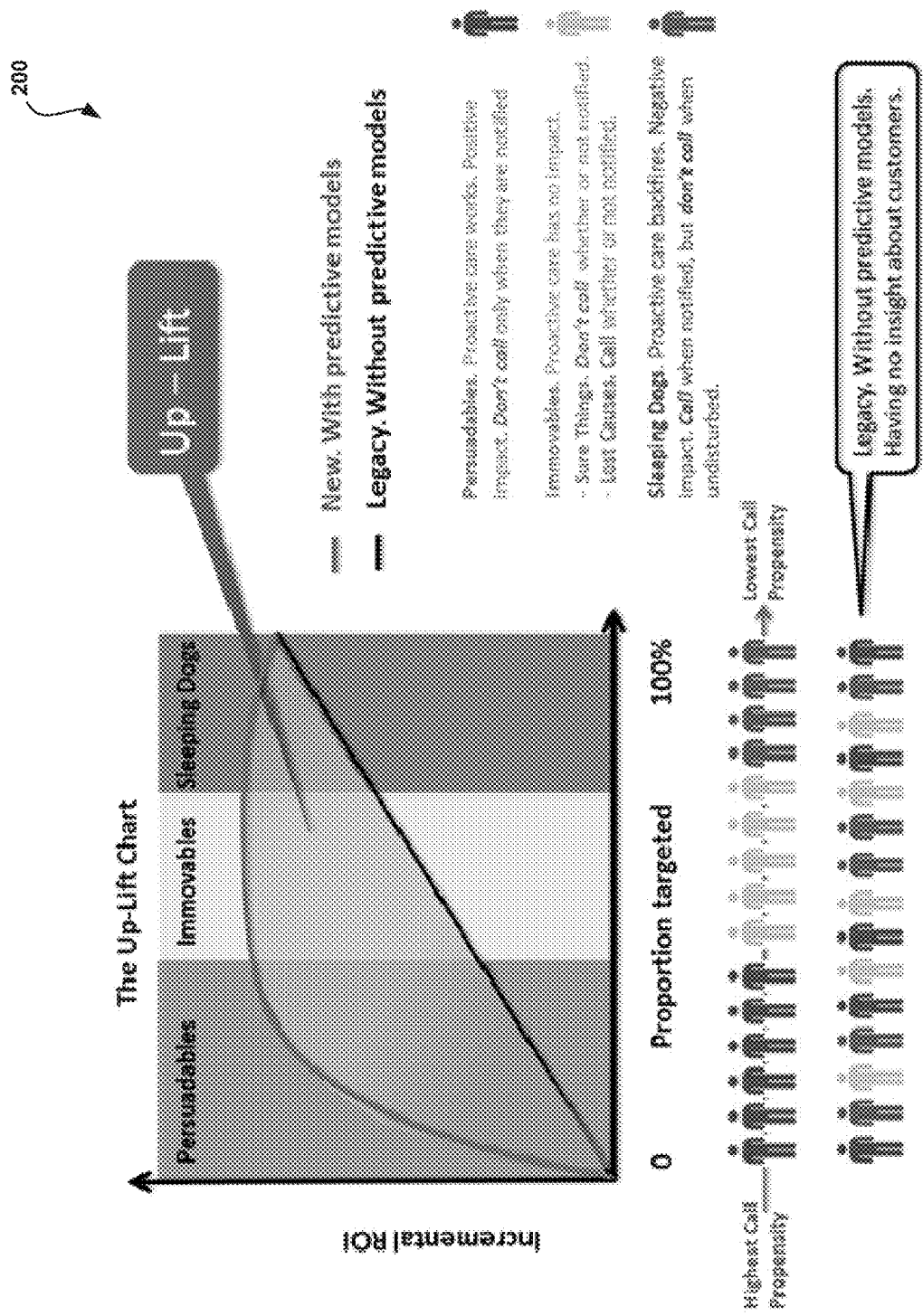
FIG. 2 illustrates an up-lift chart, in accordance with one embodiment.

FIG. 2 illustrates an up-lift chart 200, in accordance with one embodiment. As an option, the up-lift chart 200 may be implemented in the context of the details of FIG. 1. Of course, however, the up-lift chart 200 may be implemented in the context of any desired environment. Further, the aforementioned definitions may equally apply to the description below.

As shown in FIG. 2, the tipping point between the persuadable customer segment and the immovable customer segment is where the ROI ceases to increase, whereas the tipping point between the immovable customer segment and the sleeping dog customer segment is where the ROI starts decreasing because of backfire (i.e. there becomes a negative impact due to proactive notification). Using up-lift analysis of the CSP's own customer call history benefits the CSP by forecasting the ROI.

Figure 3:
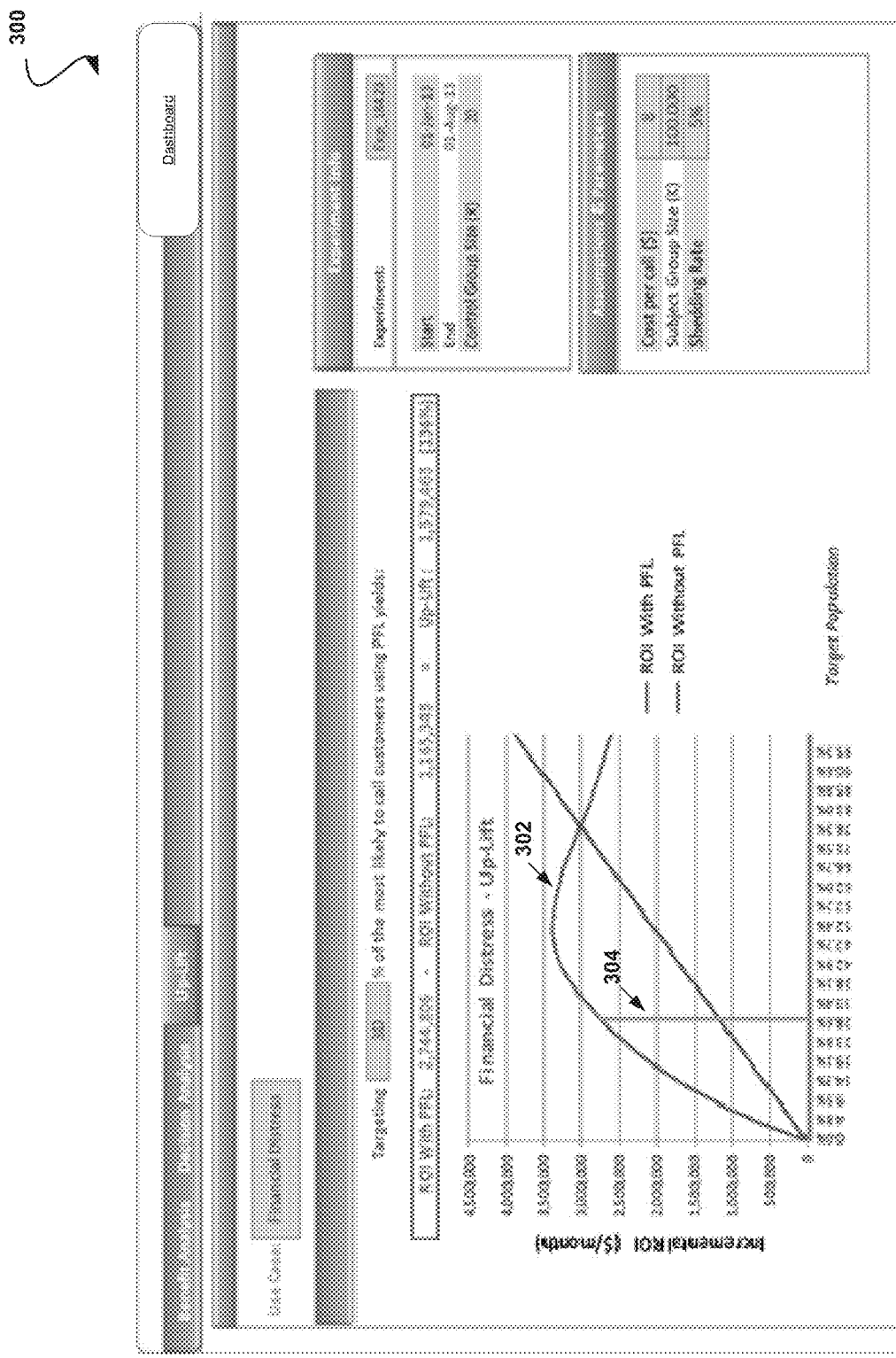
FIG. 3 illustrates a proactive care up-lift graphical user interface, in accordance with one embodiment.

FIG. 3 illustrates a proactive care up-lift graphical user interface 300, in accordance with one embodiment. As an option, the user interface 300 may be viewed in the context of the details of the previous Figures. Of course, however, the user interface 300 may be viewed in the context of any desired environment. Further, the aforementioned definitions may equally apply to the description below.

As shown in FIG. 3, the user interface 300 is capable of presenting an up-lift chart. Within this up-lift chart, based on a CSP's call history of its own call center, both the resulted ROI as well as its associated up-lift may be shown, given the proportion of population that has been selected as a target. In this example, the interface 300 illustrates a selection of 30% of the target population, a resulted ROI of approximately $2.75 M using predictive analytics based proactive care, compared to a resulted ROI of $1.16 M not using predictive analytics models, but targeting customers randomly (e.g. 136% up-lift of ~$1.6 M).

The user interface 300 provides an up-lift dashboard to visually optimize the correct proportion of population to target, in terms of up-lift and ROI maximization. The invention calculates the up-lift and demonstrates it within this dashboard (illustrated as curve 302), based on the historical data of customers' calls to the call center. Instead of randomly targeting customers, customers may be targeted based on their propensity to call, which may be predicted using the proactive care predictive models described herein. The line 304 depicted in FIG. 3 defines the selected target population, and thus defines the proactive threshold. The dashboard may function to simulate the projected ROI and the associated up-lift, dependent of the selection of the proactive threshold.

This threshold transforms the model output (i.e. the 'soft' continuous propensity of a customer to call), into a 'hard' binary decision whether a customer will call (i.e. a 'TRUE') or will not call (i.e. 'FALSE'). In this case, customers whose call propensity is higher than the proactive threshold will be notified, whereas customers whose call propensity is lower than the proactive threshold will not be notified.

Associated with each such selection of the proactive threshold are four options in terms of whether the model correctly predicted whether the customer will eventually call the call center or not. These four options are depicted via the confusion matrix entity depicted in FIG. 4. FIG. 4 shows a confusion matrix 400 for customer care, in accordance with one embodiment.

Associated with the definitions within the confusion matrix 400, there are common performance metrics to measure the performance of the predictive models. FIG. 5 illustrates a chart 500 showing confusion based performance metrics, in accordance with one embodiment.

With reference to FIG. 4, the 'Will-Call' column of the confusion matrix 400 refers to the proactive opportunity. In other words, this column indicates all cases where a predicted call propensity is above the proactive threshold. The False Positive errors are interpreted as potential backfires, because the customer was not going to call but the model predicted the customer would. Hence, the customer will be contacted and it may potentially backfire. The Precision performance measurement therefore measures accuracy in terms of succeeding to minimize backfire.

The 'Did-Call' row of the confusion matrix 400 indicates the shedding opportunity (i.e. all actual calls that could have been shed or avoided). The False Negative errors are interpreted as missed opportunities. In other words, ROI will not be increased from these missed opportunities. The Recall performance measurement therefore measures how well the opportunity to shed the calls was utilized, thereby increasing the ROI.

The combination of Precision and Recall together gives rise to the baseline calculation of the up-lift, out of historical data, and hence can be plotted as an up-lift chart (e.g. as depicted in FIGS. 2 and 3, etc.). In one embodiment, the F-Measure may be chosen to implement this combination of precision and recall. The F-Measure is the harmonic mean of precision and recall, and is formulated as:

$$F\text{-Measure} = \frac{1}{\alpha \cdot \frac{1}{P} + (1-\alpha) \cdot \frac{1}{R}};$$

where P stands for Precision, R stands for Recall, $\alpha=0.5$ gives equal weight for precision and recall, $\alpha>0.5$ prefers precision over recall, and $\alpha<0.5$ prefers recall over precision. Utilizing the F-Measure to calculate up-lift in the context of the techniques described herein is unique.

In various embodiments, different weights may be assigned for precision and recall. Additionally, different cost and profit caused by backfire or shedding a call (respectively) may be assigned. Since both backfire and shedding a call converge to the same result (i.e. an incoming call to the call center), an equal weight may be assigned (i.e. assigning $\alpha=0.5$). The up-lift chart plotted in FIG. 3 is therefore the plot of the calculated F-Measure based on historical data of the CSP.

As part of a second phase, during production, a proactive care system may send proactive notifications to customers that were predicted by the system as going to call to the call center, because of different emerged issues.

One objective of up-lift modeling is to model the change in behavior of customers due to contacting them. Therefore, in order to calculate up-lift in live production, a customer's response to the notification is measured. In other words, the system may identify whether the customer eventually called after being notified, or not. This is a different calculation than the calculation described for phase one, using historical data, prior to production.

Figure 6:
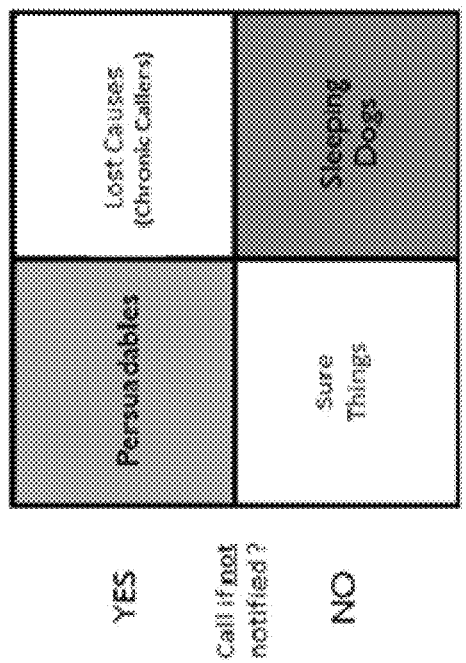
FIG. 6 shows an example of a 'hard' binary version of up-lift segmentation for proactive care, in accordance with one embodiment.

During the second phase, up-lift may be calculated using a cascade of two different predictive models. Since up-lift modeling is about modeling the change in behavior of customers due to contacting them, the up-lift modeling customers' segmentation ('persuadables', 'immovables', 'sleeping dogs') may be projected onto a two dimensional space with axes indicating whether a customer will call if notified and whether a customer will call if NOT notified. FIG. 6 shows an example 600 of a 'hard' binary version of up-lift segmentation for proactive care, in accordance with one embodiment.

Figure 7:
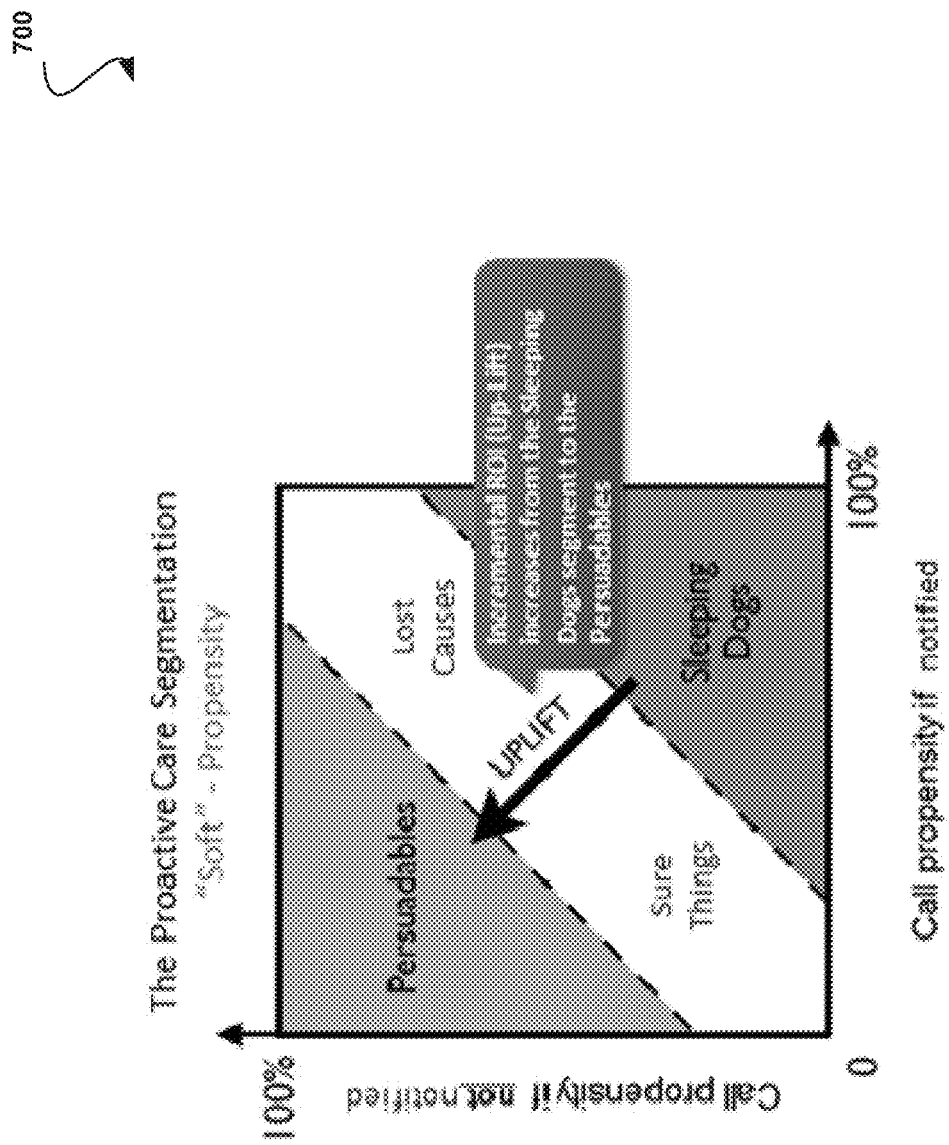
FIG. 7 shows an example of a 'soft' propensity version of up-lift segmentation for proactive care, in accordance with one embodiment.

In contrast to the 'hard' binary view, depicted in FIG. 6, the proactive care system may generate predictive models that indicate a continuous likelihood of a customer to call (e.g. a number between 0 and 1, etc.). Therefore, an alternative 'soft' continuous two dimensional space may be utilized, as depicted in FIG. 7, such that call and backfire propensity models may generated and cascaded whether or not a customer is notified. FIG. 7 shows an example 700 of a 'soft' propensity version of up-lift segmentation for proactive care, in accordance with one embodiment. As shown, the axes indicate a customer's propensity to call if notified and a customer's propensity to call if NOT notified.

FIG. 7 shows smoother segments within the 'soft' propensity space than in the binary space. The Y-axis (i.e. the call propensity if not notified) stands for measured call propensity predictive models. In other words, the call propensity models indicate, before a customer is notified, whether or not to send the customer a proactive notification.

Figure 8:
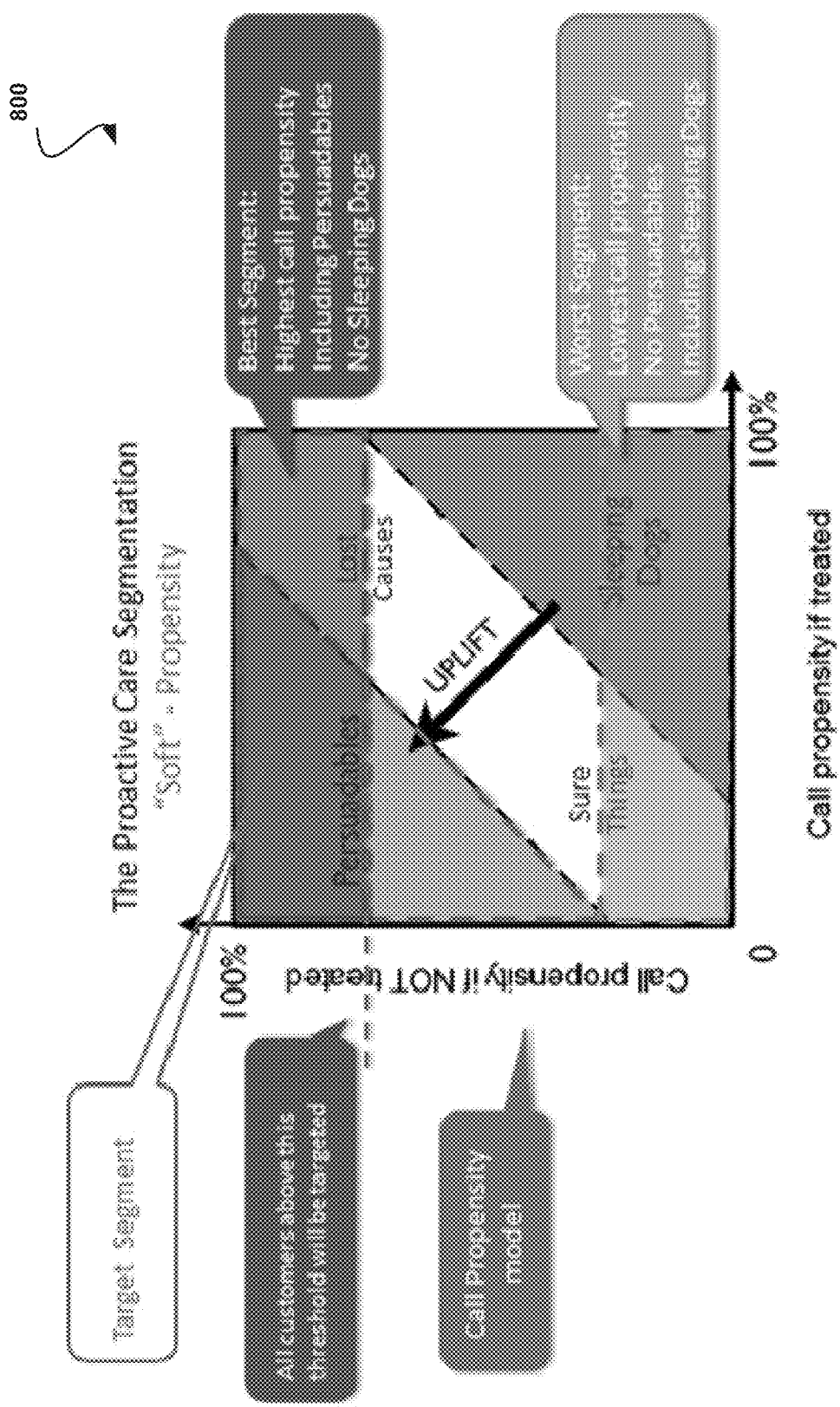
FIG. 8 shows an example of defining segments based on a call propensity model's prediction, in accordance with one embodiment.

Setting the proactive threshold at the tipping point, just above the 'Sleeping Dogs' segment, as illustrated in FIG. 8, highlights the best segment possible. FIG. 8 shows an example 800 of defining segments based on a call propensity model's prediction, in accordance with one embodiment.

This segment identified by setting the proactive threshold at the tipping point contains customers whose call propensity is the highest, totally excludes the 'sleeping dogs' and partially includes the persuadables (the target segment). Similarly, setting the proactive threshold at the tipping point, just below the persuadables segment, gives rise to the worst segment possible. This segment contains customers whose call propensity is the lowest, totally excludes the persuadables and partially includes the 'sleeping dogs'.

The X-axis (i.e. the call propensity if notified) stands for a backfire propensity predictive model. In addition to the call propensity model, the proactive care system may execute a backfire propensity predictive model to predict the propensity of a customer to call, given the customer will be proactively notified.

Figure 9:
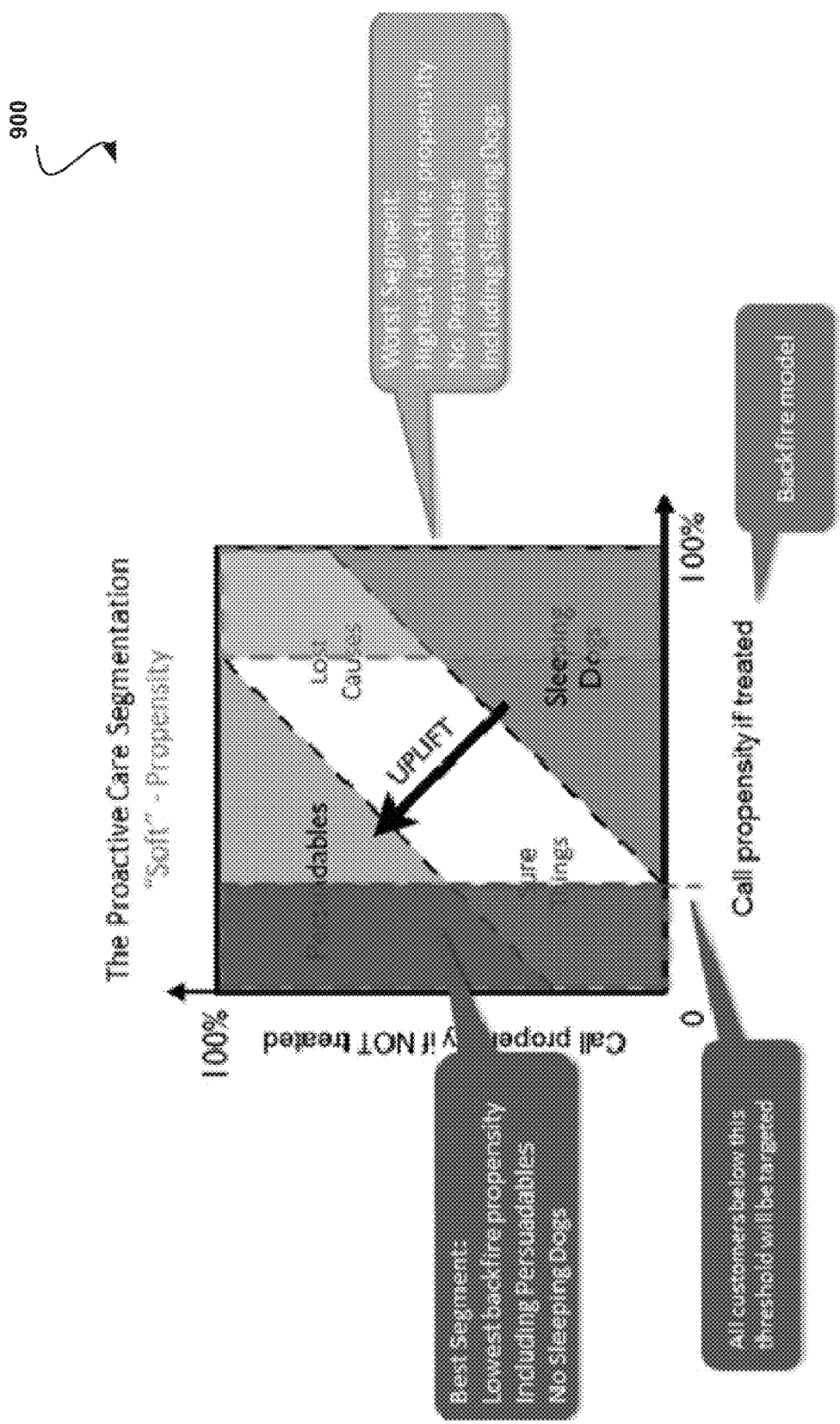
FIG. 9 illustrates an example of defining segments based on a backfire propensity model's prediction, in accordance with one embodiment.

Similarly as done for the call propensity model, setting the proactive threshold at the different points, as illustrated in FIG. 9, highlights the best and worst segments possible. FIG. 9 illustrates an example 900 of defining segments based on a backfire propensity model's prediction, in accordance with one embodiment.

Figure 10:
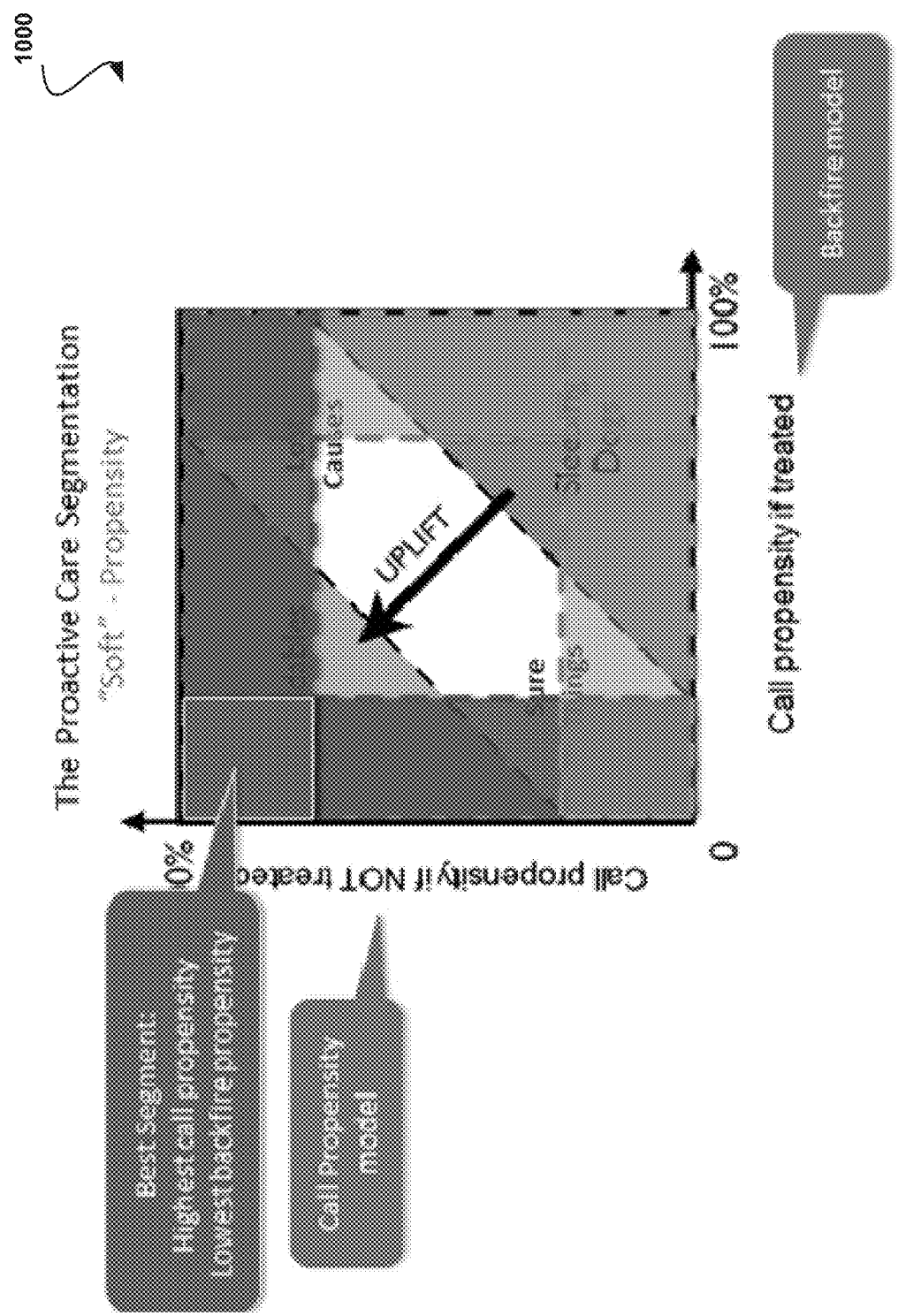
FIG. 10 shows cascading call and backfire propensity models, in accordance with one embodiment.

By executing the backfire propensity model right after the execution of the call propensity model, causes intersection of the two filtered out 'no sleeping dogs' segments, due to the execution of each one of them, and gives rise to the final segment that includes only 'persuadables', as illustrated in FIG. 10. FIG. 10 shows cascading call and backfire propensity models 1000, in accordance with one embodiment.

Figure 11:
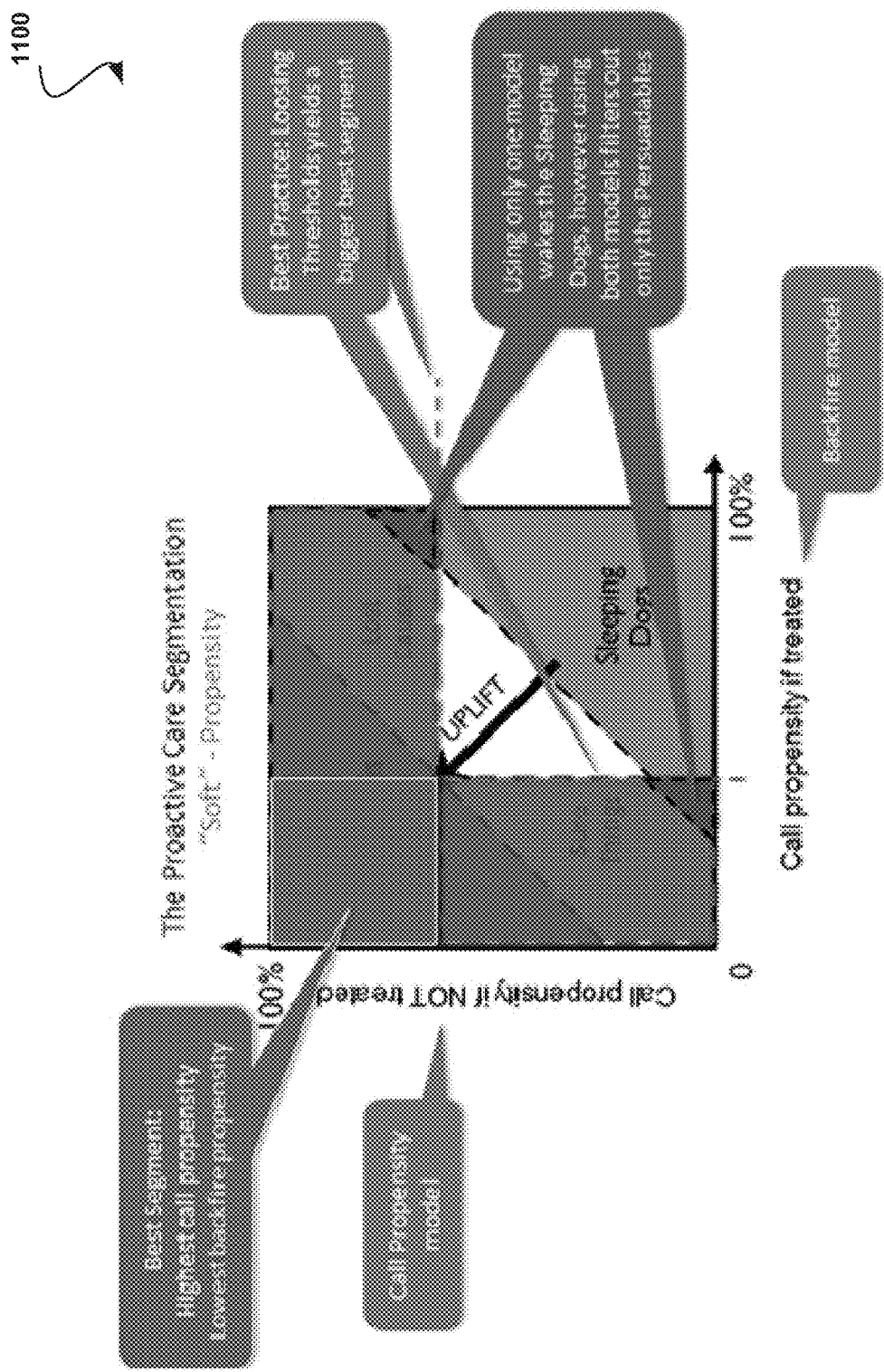
FIG. 11 illustrates an example of loosening thresholds to maximize a persuadable customer segment, in accordance with one embodiment.

Maximizing ROI is achieved by a maximum utilization of the persuadables segment. The more persuadable customers targeted, the higher the ROI. Using the cascaded up-lift modeling framework, the persuadables segment may be maximized by loosening the thresholds. In this case, the sleeping dogs will be included in each one of the models, but will eventually be filtered out by cascading them together, as illustrated in FIG. 11. FIG. 11 illustrates an example 1100 of loosening thresholds to maximize a persuadable customer segment, in accordance with one embodiment.

Thus, by utilizing the techniques described herein a two-phase framework of up-lift modeling may be implemented, pre-production and post-production, to forecast and monitor the most effective proactive targeting strategy of customers, respectively. In pre-production the up-lift chart may be calculated based on data analysis survey of call history to a call center. By analyzing call history of customers, a forecast for application ROI may be provided, as well as a visualized optimization tool for targeting the optimal proportion of customers.

In various embodiments, the pre-production phase may function as a pre-sale tool. In addition, using the CSP's own call history, the forecasted ROI may be calculated as well as the forecasted up-lift.

In the pre-production phase, any performance metric that combines both precision and recall may be utilized. In post-production a cascaded framework of call and backfire propensity models may be implemented to optimize the focus on the persuadable customers.

Figure 12:
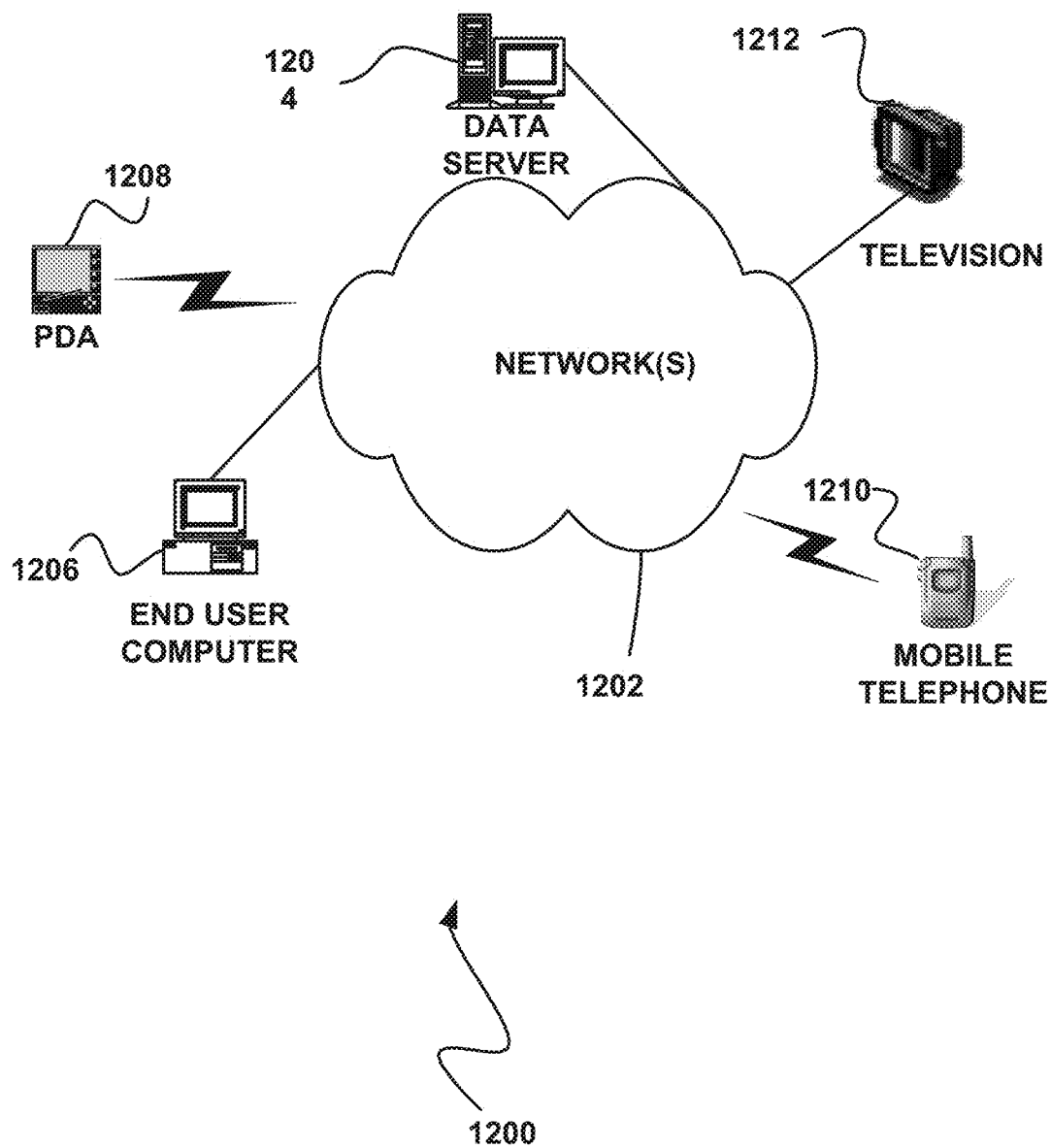
FIG. 12 illustrates a network architecture, in accordance with one possible embodiment.

FIG. 12 illustrates a network architecture 1200, in accordance with one possible embodiment. As shown, at least one network 1202 is provided. In the context of the present network architecture 1200, the network 1202 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 1202 may be provided.

Coupled to the network 1202 is a plurality of devices. For example, a server computer 1204 and an end user computer 1206 may be coupled to the network 1202 for communication purposes. Such end user computer 1206 may include a desktop computer, lap-top computer, and/or any other type of logic. Still yet, various other devices may be coupled to the network 1202 including a personal digital assistant (PDA) device 1208, a mobile phone device 1210, a television 1212, etc.

Figure 13:
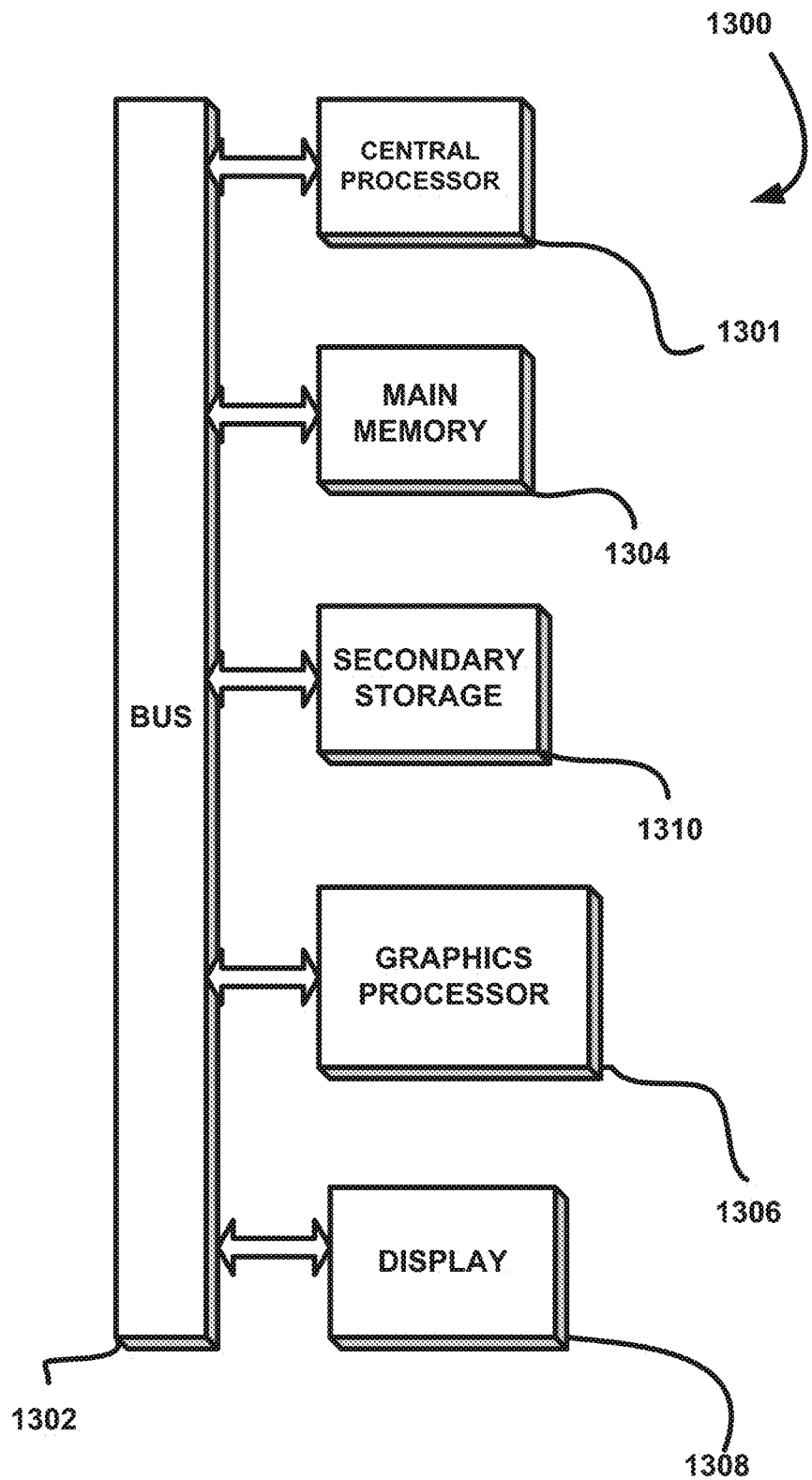
FIG. 13 illustrates an exemplary system, in accordance with one embodiment.

FIG. 13 illustrates an exemplary system 1300, in accordance with one embodiment. As an option, the system 1300 may be implemented in the context of any of the devices of the network architecture 1200 of FIG. 12. Of course, the system 1300 may be implemented in any desired environment.

As shown, a system 1300 is provided including at least one central processor 1301 which is connected to a communication bus 1302. The system 1300 also includes main memory 1304 [e.g. random access memory (RAM), etc.]. The system 1300 also includes a graphics processor 1306 and a display 1308.

The system 1300 may also include a secondary storage 1310. The secondary storage 1310 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 1304, the secondary storage 1310, and/or any other memory, for that matter. Such computer programs, when executed, enable the system 1300 to perform various functions (as set forth above, for example). Memory 1304, storage 1310 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising:
   computer code for identifying, by a hardware processor of a service provider, historical data indicating customer calls to a call center of the service provider by a plurality of customers of the service provider;
   computer code for generating, by the hardware processor of the service provider based on the historical data, at least one first predictive model indicating a propensity of each of the plurality of customers to call the call center of the service provider;
   computer code for identifying, by the hardware processor of the service provider, at least one issue for the plurality of customers with a service provided by the service provider;
   computer code for determining, by the hardware processor of the service provider, a call propensity threshold;

computer code, responsive to identifying the at least one issue, for determining, by the hardware processor of the service provider from the first predictive model, a first portion of the plurality of customers having a propensity to call the call center as a result of the at least one issue that is higher than the call propensity threshold;

computer code for proactively notifying the first portion of the plurality of customers, by the hardware processor of the service provider;

computer code for monitoring, by the hardware processor of the service provider, a behavior of the plurality of customers to determine whether each of the plurality of customers called the call center after the hardware processor of the service provider proactively notified the first portion of the plurality of customers;

computer code for generating, by the hardware processor of the service provider, at least one second predictive model, based at least in part on the determination of whether each of the plurality of customers called the call center after the hardware processor of the service provider proactively notified the first portion of the plurality of customers; and computer code for determining, by the hardware processor of the service provider from the at least one second predictive model, a second portion of the plurality of customers to proactively notify;

computer code for proactively notifying the second portion of the plurality of customers, by the hardware processor of the service provider.

2. The computer program product of claim 1, wherein the computer program product is operable such that the at least one first predictive model is utilized to generate a first up-lift model.

3. The computer program product of claim 2, wherein the computer program product is operable such that the at least one second predictive model is utilized to generate a second up-lift model.

4. The computer program product of claim 1, wherein the computer program product is operable such that the at least one first predictive model includes a call propensity model.

5. The computer program product of claim 4, wherein the computer program product is operable such that the call propensity model is utilized to generate a first up-lift model.

6. The computer program product of claim 5, further comprising computer code for utilizing the first up-lift model as a forecast of a return on investment (ROI).

7. The computer program product of claim 6, further comprising computer code for displaying a graphical user interface including the forecast of the ROI.

8. The computer program product of claim 7, further comprising computer code for utilizing the first up-lift model to generate an up-lift chart capable of being displayed utilizing the graphical user interface.

9. The computer program product of claim 8, wherein the call propensity threshold is based on a target ROI.

10. The computer program product of claim 9, wherein the computer program product is operable such that the call propensity threshold functions to identify an optimal portion of the plurality of customers to be proactively notified.

11. The computer program product of claim 10, wherein the computer program product is operable such that customers having a propensity to call the call center as a result of the at least one issue that is lower than the call propensity threshold are not included in the first portion of the plurality of customers.

12. The computer program product of claim 1, wherein the computer program product is operable such that generating the at least one second predictive model includes generating a backfire propensity model.

13. The computer program product of claim 1, wherein the computer program product is operable such that the at least one first predictive model represents a call propensity and is associated with an up-lift chart calculated utilizing an F-measure performance metric of the at least one first predictive model.

14. The computer program product of claim 1, wherein the computer program product is operable such that the at least one first predictive model independently targets the first portion of the plurality of customers and the at least one second predictive model independently targets the second portion of the plurality of customers.

15. The computer program product of claim 14, further comprising computer code for cascading the second predictive model, which includes a backfire propensity model, after the first predictive model, which includes a call propensity model, thereby causing an intersection of the first portion of the plurality of customers and the second portion of the plurality of customers, and resulting in a final target best persuadable customers segment, comprised of customers with highest call propensity and lowest backfire propensity.

16. A method, comprising:
identifying, by a hardware processor of a service provider, historical data indicating customer calls to a call center of the service provider by a plurality of customers of the service provider;

generating, by the hardware processor of the service provider based on the historical data, at least one first predictive model indicating a propensity of each of the plurality of customers to call the call center of the service provider;

identifying, by the hardware processor of the service provider, at least one issue for the plurality of customers with a service provided by the service provider;

determining, by the hardware processor of the service provider, a call propensity threshold;

responsive to identifying the at least one issue, determining, by the hardware processor of the service provider from the first predictive model, a first portion of the plurality of customers having a propensity to call the call center as a result of the at least one issue that is higher than the call propensity threshold;

proactively notifying the first portion of the plurality of customers, by the hardware processor of the service provider;

monitoring, by the hardware processor of the service provider, a behavior of the plurality of customers to determine whether each of the plurality of customers called the call center after the hardware processor of the service provider proactively notified the first portion of the plurality of customers;

generating, by the hardware processor of the service provider, at least one second predictive model, based at least in part on the determination of whether each of the plurality of customers called the call center after the hardware processor of the service provider proactively notified the first portion of the plurality of customers; and determining, by the hardware processor of the service provider from the at least one second predictive model, a second portion of the plurality of customers to proactively notify;

proactively notifying the second portion of the plurality of customers, by the hardware processor of the service provider.

17. The method of claim 16, wherein the at least one first predictive model independently targets the first portion of the plurality of customers and the at least one second predictive model independently targets the second portion of the plurality of customers; and further comprising cascading the second predictive model, which includes a backfire propensity model, after the first predictive model, which includes a call propensity model, thereby causing an intersection of the first portion of the plurality of customers and the second portion of the plurality of customers, and resulting in a final target best persuadable customers segment, comprised of customers with highest call propensity and lowest backfire propensity.

18. A system comprising:
a memory system of a service provider storing computer code; and
a hardware processor of the service provider that is coupled to the memory system and that executes the computer code to perform a method comprising:
identifying, by the hardware processor of the service provider, historical data indicating customer calls to a call center of the service provider by a plurality of customers of the service provider;
generating, by the hardware processor of the service provider based on the historical data, at least one first predictive model indicating a propensity of each of the plurality of customers to call the call center of the service provider;
identifying, by the hardware processor of the service provider, at least one issue for the plurality of customers with a service provided by the service provider;
determining, by the hardware processor of the service provider, a call propensity threshold;
responsive to identifying the at least one issue, determining, by the hardware processor of the service provider from the first predictive model, a first portion of the plurality of customers having a propensity to call the call center as a result of the at least one issue that is higher than the call propensity threshold;
proactively notifying the first portion of the plurality of customers, by the hardware processor of the service provider;
monitoring, by the hardware processor of the service provider, a behavior of the plurality of customers to determine whether each of the plurality of customers called the call center after the hardware processor of the service provider proactively notified the first portion of the plurality of customers;
generating, by the hardware processor of the service provider, at least one second predictive model, based at least in part on the determination of whether each of the plurality of customers called the call center after the hardware processor of the service provider proactively notified the first portion of the plurality of customers; and
determining, by the hardware processor of the service provider from the at least one second predictive model, a second portion of the plurality of customers to proactively notify;
proactively notifying the second portion of the plurality of customers, by the hardware processor of the service provider.

* * * * *